(12) United States Patent
Kim et al.

(10) Patent No.: US 9,543,799 B2
(45) Date of Patent: Jan. 10, 2017

(54) SINGLE ROTOR-TYPE MOTOR

(71) Applicant: AMOTECH CO., LTD., Incheon (KR)

(72) Inventors: Byung Soo Kim, Anyang-si (KR);
Hyung Hwan Ko, Anseong-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 14/659,839

(22) Filed: Mar. 17, 2015

(65) Prior Publication Data
US 2015/0194852 A1    Jul. 9, 2015

Related U.S. Application Data

(62) Division of application No. PCT/KR2013/008377, filed on Sep. 16, 2013.

(30) Foreign Application Priority Data

Sep. 24, 2012  (KR) .................. 10-2012-0105863

(51) Int. Cl.
| H02K 1/04 | (2006.01) |
|---|---|
| H02K 11/00 | (2016.01) |
| H02K 3/48 | (2006.01) |
| H02K 3/34 | (2006.01) |
| H02K 3/28 | (2006.01) |
| H02K 3/52 | (2006.01) |
| H02K 3/30 | (2006.01) |
| H02K 1/14 | (2006.01) |

(52) U.S. Cl.
CPC ........... *H02K 3/28* (2013.01); *H02K 3/30* (2013.01); *H02K 3/345* (2013.01); *H02K 3/522* (2013.01); *H02K 1/148* (2013.01); *H02K 2213/12* (2013.01)

(58) Field of Classification Search
CPC ..................... H02K 3/18; H02K 3/52

USPC ................... 310/43, 71, 214–215
See application file for complete search history.

(56) References Cited

U.S. PATENT DOCUMENTS

| 2007/0128919 A1* | 6/2007 | Demuth | H01R 4/245 |
| | | | 439/404 |
| 2010/0199725 A1* | 8/2010 | Lee | H02K 3/522 |
| | | | 68/139 |
| 2011/0316365 A1 | 12/2011 | Kim | |

FOREIGN PATENT DOCUMENTS

| JP | 07023976 | 5/1995 |
| JP | 2005130580 A * | 5/2005 |
| KR | 2019980050529 | 10/1998 |
| KR | 1020050000245 | 1/2005 |
| KR | 20110114150 A * | 10/2011 |
| KR | 1020110114150 | 10/2011 |

(Continued)

OTHER PUBLICATIONS

International Search Report—PCT/KR2013/008377 dated Dec. 12, 2013.

*Primary Examiner* — Jose Gonzalez Quinones
(74) *Attorney, Agent, or Firm* — Cantor Colburn LLP

(57) ABSTRACT

A single rotor type motor includes: a stator including a plurality of stator cores that are divided in a plural number and radially arranged, a bobbin made of an insulating material and wrapped on an outer surface of each of the stator cores, and coils wound on an outer surface of the bobbin; and a single rotor disposed with a certain gap from any one surface of an inner surface of the stator and an outer surface thereof, wherein a wiring unit for electrically wiring coils wound on each stator core is integrally formed with the bobbin, and the wiring unit is arranged at an opposing end to an end facing the rotor of the stator core.

4 Claims, 8 Drawing Sheets

(56) References Cited

FOREIGN PATENT DOCUMENTS

KR 1020110139552 12/2011

* cited by examiner

SINGLE ROTOR-TYPE MOTOR

CROSS REFERENCE TO RELATED APPLICATIONS

This application is a divisional of International Application No. PCT/KR2013/008377, filed on Sep. 16, 2013, which claims priority to and the benefit of Korean Application No. 10-2012-0105863 filed on Sep. 24, 2012 in the Korean Patent Office, the entire contents of which are incorporated herein by reference.

TECHNICAL FIELD

The present invention relates to a single rotor type motor, and more particularly to a single rotor type motor in which coil terminals for electrically connecting stator coils are placed on a stator bobbin to thus enable easy assembly and solve a problem of coil disconnection.

BACKGROUND ART

Typically, a single rotor type motor includes a stator that receives power from an external power source and a rotor that is disposed with a certain gap on the outer circumferential surface or the inner circumferential surface of the stator and to which a rotating shaft is fixed.

The stator includes a stator core on which a plurality of iron pieces are stacked and formed and are arranged radially at regular intervals, a bobbin that is formed to be surrounded on the outer circumferential surface of the stator core and made of an insulating material, and coils that are wound around the outer circumferential surface of the bobbin.

The rotor includes a rotor support that is fixed to a rotating shaft, and a magnet that is mounted on the rotor support and that is arranged with a certain gap on the inner surface or the outer surface of the stator.

Here, the stator core is formed of individually divided split cores, and thus includes coil connection terminals for electrically connecting between coils wound around the cores.

A device for fixing terminals in bobbins for a conventional motor is disclosed in Korean Utility Model Registration 20-0159355. Each of the bobbins includes a coil winding portion on which coil wires for a circuit are wound. Each of the bobbins includes a plurality of slot grooves at one side thereof so that terminals are tight fitted with the slot grooves. Each of the terminals includes: a support surface that is inserted into the inner side of one slot groove; a first wiring unit that is bent and formed at one side end of the support surface so as to be inserted into one side of the slot groove and simultaneously to be protruded on the upper surface of the bobbin; and a second wiring unit that is bent and formed at the other side end of the support surface so as to be in contact with the side edge of the bobbin.

However, a structure of terminals for connecting coils of such a conventional motor has no structure of peeling off insulating outer sheaths of the coils and thus workers should strip out the insulating outer sheaths of the coils, to accordingly cause a complicated process.

Furthermore, the terminal fixing device of the conventional motor may cause the terminals to be seceded from the slot grooves, to accordingly cause a problem such as disconnection of the coils.

SUMMARY OF THE INVENTION

To solve the above problems or defects, it is an object of the present invention to provide a single rotor type motor in which a terminal pocket into which a coil terminal for connecting between coils is inserted is formed at an opposing end to an end facing a magnet of both ends of each of bobbins, to thus minimize occurrence of disconnection of the coils and simplify the structure of the single rotor type motor.

It is another object of the present invention to provide a single rotor type motor in which a coil terminal is formed integrally with a blade and thus when the coil terminal is inserted into a terminal pocket, insulating outer sheaths of coils are peeled off by the blade and fixed to the coil terminal, to thereby make a separate process of peeling off the insulating outer sheaths of the coils unnecessary, and simplify a manufacturing process of the single rotor type motor.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a single rotor type motor comprising: a stator including a plurality of stator cores that are divided in a plural number and radially arranged, a bobbin made of an insulating material and wrapped on an outer surface of each of the stator cores, and coils wound on an outer surface of the bobbin; and a single rotor disposed with a certain gap from any one surface of an inner surface of the stator and an outer surface thereof, wherein a wiring unit for electrically wiring coils wound on each stator core is integrally formed with the bobbin, and the wiring unit is arranged at an opposing end to an end facing the rotor of the stator core.

The stator core according to the present invention comprises: a rod portion of a plate shape and around which coils are wound; a tooth portion that is extensibly formed in a lateral direction on one end of both ends of the rod portion and that is disposed facing a magnet of the rotor; and a connecting portion that is formed at the other side end of the rod portion and that connects between the stator cores, wherein the wiring unit is disposed on the connecting portion.

The wiring unit according to the present invention comprises: a terminal pocket that is integrally formed with the bobbin and into which coils are inserted; and a coil terminal that is inserted into the terminal pocket and for electrically connecting between the coils.

As described above, a single rotor type motor according to the present invention is configured to form a terminal pocket into which a coil terminal for connecting between coils is inserted at an opposing end to an end facing a magnet of both ends of each of bobbins, to thus minimize occurrence of disconnection of the coils and simplify the structure of the single rotor type motor.

Further, the single rotor type motor according to the present invention is configured to form a coil terminal integrally with a blade, to thus peel off insulating outer sheaths of coils by the blade and fixed to the coil terminal, when the coil terminal is inserted into a terminal pocket, to thereby make a separate process of peeling off the insulating outer sheaths of the coils unnecessary, and simplify a manufacturing process of the single rotor type motor.

DETAILED DESCRIPTION OF THE INVENTION

Figure 1:
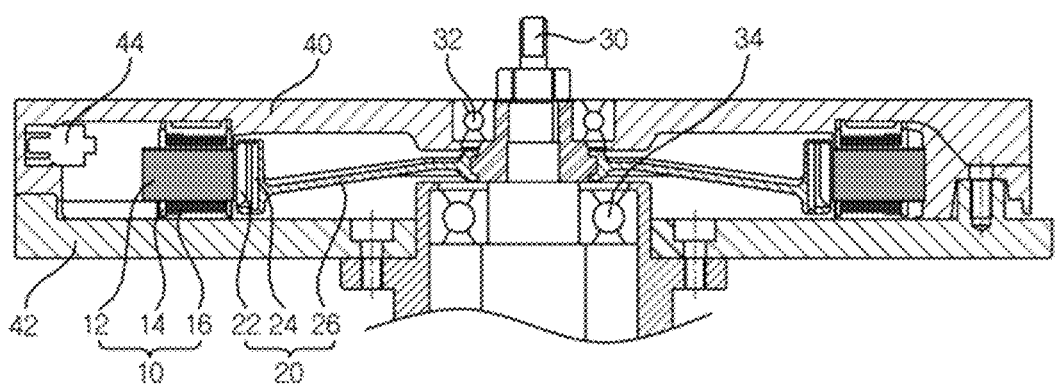
FIG. 1 is a cross-sectional view of a motor according to a first embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user or operator's intention, or the custom. Definitions of these terms herein need to be made based on the contents across the whole application.

FIG. 1 is a cross-sectional view of a single rotor type motor according to a first embodiment of the present invention.

Referring to FIG. 1, a single rotor type motor includes a stator 10 and a rotor 20.

The motor according to the present embodiment may be mainly used in washing machines. In addition to the washing machines, the motor according to the present embodiment may be also used in other devices requiring a rotational drive force.

The rotor 20 is configured in the form of an inner rotor type disposed on the inner circumferential surface of the stator 10, and includes: a magnet 22 disposed with a certain gap from the inner surface of the stator 10; a back yoke 24 disposed on the back surface of the magnet 22; and a rotor support 26 to which the magnet 22 and the back yoke 24 are fixed and at the center of which a rotating shaft 30 is mounted.

The stator 10 includes: a plurality of stator cores 12 that are divided in a plural number and radially arranged; a bobbin 14 made of an insulating material and wrapped on an outer surface of each of the stator cores 12; and coils 16 wound on an outer surface of the bobbin 14.

The stator 10 is fixed to motor housings 40 and 42 and the rotating shaft 30 is rotatably supported to the motor housings 40 and 42 through bearings 32 and 34. The motor housings are configured to include an upper housing 40 that is disposed on the top surface of the motor and in which a terminal 44 connected to an external power source is mounted and a lower housing 42 that is attached to the lower side of the upper housing 40.

Here, the motor according to this embodiment is a single rotor type motor, and thus the rotor support 26 is arranged in only the inside of the stator 10. Accordingly, the motor according to this embodiment can be configured in a structure that the upper surface of the stator 10 contact the inner surface of the upper housing 40, and the lower surface of the stator 10 is in contact with the inner surface of the lower housing 42, to thereby reduce thickness of the motor.

Accordingly, when the motor according to this embodiment is used as a driving motor of a washing machine, the height of the washing machine can be reduced. That is, the size of an apparatus where the motor is mounted can be made small.

Figure 2:
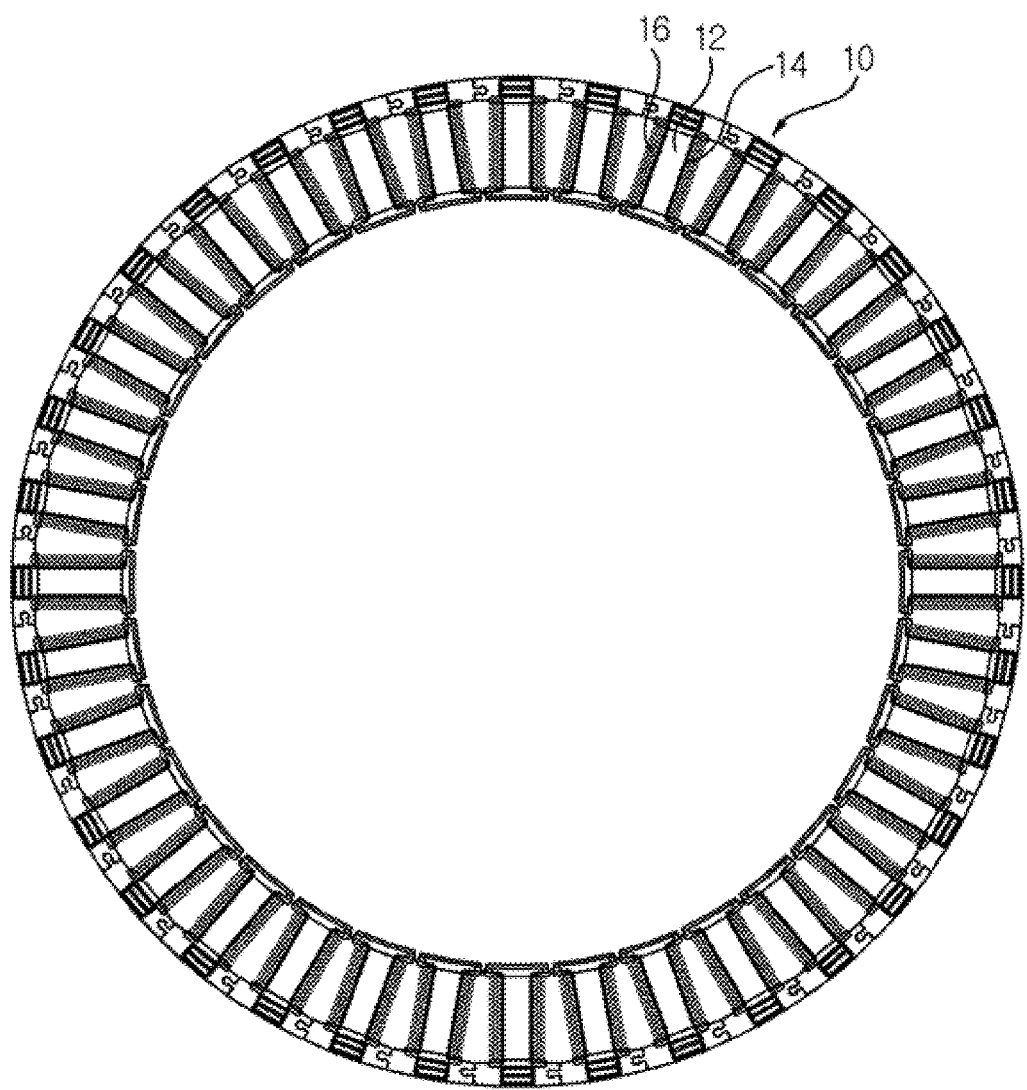
FIG. 2 is a plan view of a stator according to the first embodiment of the present invention.
Figure 3:
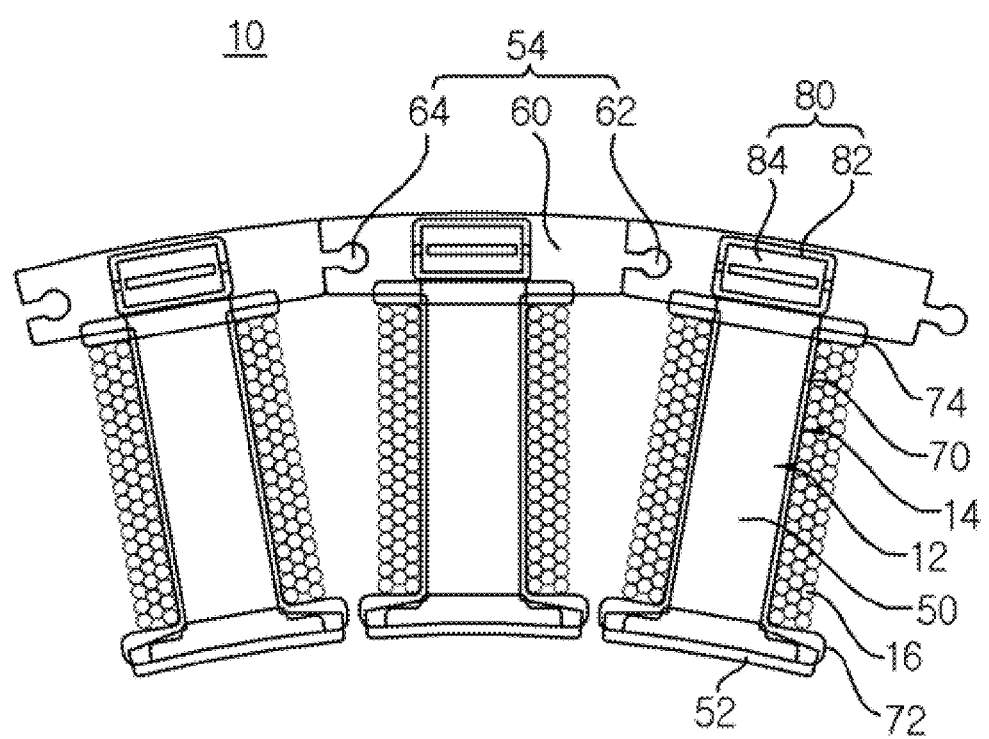
FIG. 3 is a partially enlarged view of an example of the stator according to the first embodiment of the present invention.

FIG. 2 is a plan view of a stator according to an embodiment of the present invention, and FIG. 3 is a partially enlarged view of an example of the stator according to the embodiment of the present invention.

In the embodiment of the present invention, when the stator 10 is driven by using a three-phase drive method, coil windings for a plurality of split-type stator cores 12 are successively executed for respective phases U, V, and W. When a magnetic circuit of the motor is made of, for example, a 27-slot-24-pole structure, or a 27-slot-36-pole structure, coil windings corresponding to the respective three phases U, V, and W are performed in the nine split-type stator cores for the respective phases U, V, and W.

The stator core 12 includes: a rod portion 50 of a plate shape having a certain width and around which coils are wound; an inner tooth portion 52 that is extensibly formed in a bilateral direction on the inner end of the rod portion 50 and that is disposed facing a magnet 22 of the rotor; and a connecting portion 54 that is formed at the outer end of the rod portion 50 and that connects between the stator cores that are disposed adjacently each other, so that the stator cores 12 are arranged in a radial shape.

The stator cores 12 are electrically energized to each other by the connecting portions 54 to thereby form a magnetic circuit.

Here, the connecting portion 54 is configured to include: a flange portion 60 that is extensibly formed in a bilateral direction on the outer end of the rod portion 50; a coupling protrusion 62 that is formed at one end of the flange portion 60; and a coupling groove 64 that is formed at the other end of the flange portion 60, and into which a coupling protrusion 62 of another stator core that is disposed adjacently to the stator core 12 is inserted and coupled.

Figure 4:
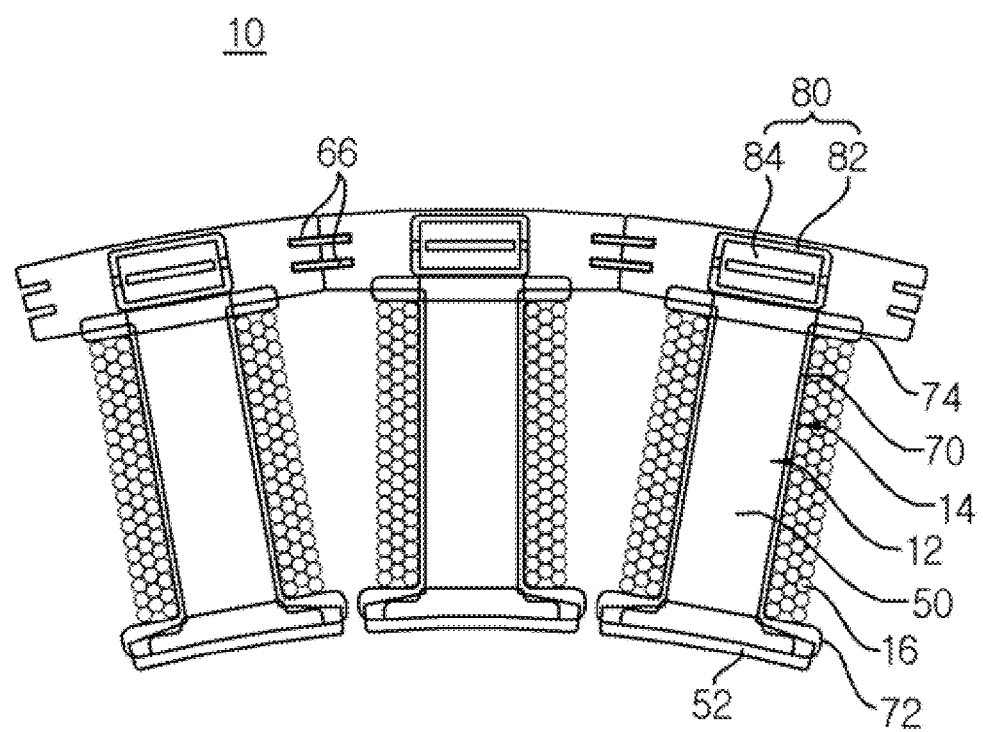
FIG. 4 is a partially enlarged view of another example of the stator according to the first embodiment of the present invention.

Further, in addition to such a structure, the connecting portion 54 is also configured to have another structure that pin holes that are formed at both sides of the flange portion 60 in which pin members are fitted between the pin holes of two adjacent stator cores 12 at a state where the two adjacent stator cores 12 are in contact with each other, to thereby connect between the two adjacent stator cores 12. Meanwhile, as shown in FIG. 4, the connecting portion 54 is also configured to have another structure that recess portions that are formed at both sides of the flange portion in which the recess portions of two adjacent stator cores 12 are caulked by using a caulking member 66 at a state where the two adjacent stator cores 12 are in contact with each other, to thereby connect between the two adjacent stator cores 12.

The bobbin 14 includes: a coil winding portion 70 that is formed to be wrapped around the outer circumferential surface of a plurality of rod portions 50 in a state where the rod portions 50 are stacked and around which coils 16 are wound; a first extension portion 72 that is formed on the inner end of the coil winding portion 70 and surrounds the inner tooth portion 52 so as to expose the inner surface of the inner tooth portion 52; and a second extension portion 74 that is formed on the outer end of the coil winding portion 70 and surrounds a part of the connecting portion 54.

In addition, a wiring unit 80 that connects between the coils wound around the split stator cores is provided in the connecting portion 54.

Since the motor according to this embodiment is a single rotor type motor, only one end of both ends of the stator core 12 is disposed to face the rotor 20. Accordingly, the connecting portion 54 connecting between the adjacent stator cores 12 is formed at the other end of both ends of the stator core 12 in opposition to the one end facing the rotor, to thereby secure a sufficient installation space as wide as the flange portion 60 forming the connecting portion 54.

The wiring unit 80 includes: a terminal pocket 82 that is disposed at the other end of the stator core 12 in opposition to the one end of the stator core 12 facing the rotor 20 and that is integrally formed with the bobbin 14 so that the ends of two or three strands of coils 16 are inserted into the terminal pocket 82; and a coil terminal 84 that is inserted into the terminal pocket 82 for electrically connecting between the coils 16.

Here, the terminal pocket 82 is specifically disposed in the flange portion 60 of the stator core 12 and is integrally formed on the side surface of the second extension portion 74 of the bobbin 14. Thus, since that a sufficient space exists in the flange portion 60, so that the terminal pocket 82 can be placed, it is easy to form the terminal pocket 82 and is relatively easy to place the ends of the coils 16, to thereby solve a problem of disconnection between the coils 16.

One of a plurality of wiring units 80 is used to form the neutral point NP at which three-phase coils of U, V, and W phases are mutually wired.

Figure 5:
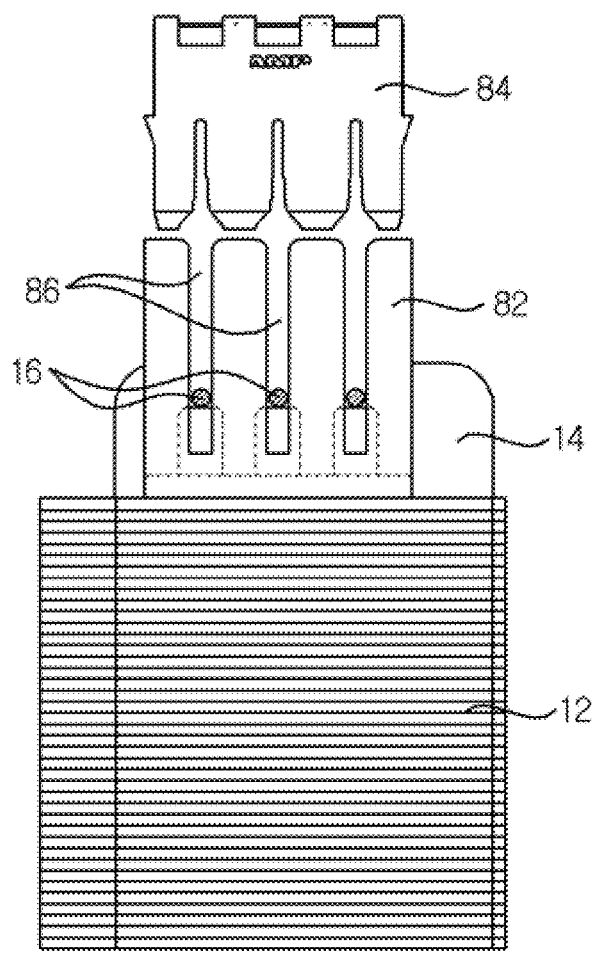
FIG. 5 is a side view of a wiring unit according to the first embodiment of the present invention.
Figure 6:
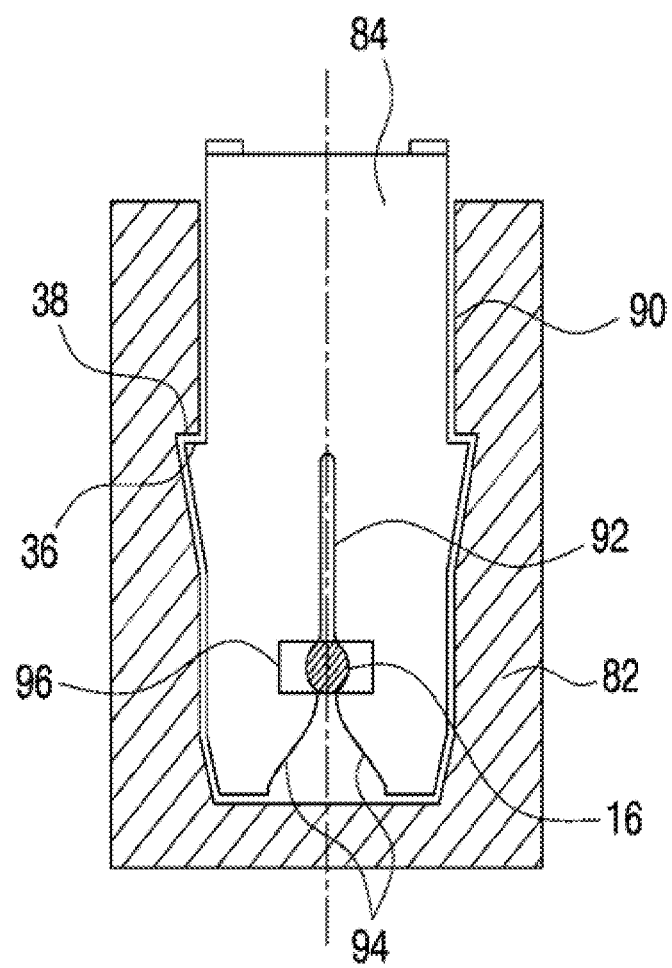
FIG. 6 is a cross-sectional view of the wiring unit according to the first embodiment of the present invention.

As shown in FIGS. 5 and 6, the wiring unit 80 may include: a terminal pocket 82 that is integrally formed with the second extension portion 74 of the bobbin 12, and that is provided with a plurality of seating grooves 86 into which the ends of two or three strands of coils 16 are inserted, in which insertion grooves 90 are formed; and a coil terminal 84 that is fitted into the insertion grooves 90 of the terminal pocket 82 for electrically connecting between the coils 16.

The terminal pocket 82 is also integrally molded when the bobbin 14 is injection molded of resin by insert molding the bobbin 14 on the outer surface of the stator core 12 after stacking the stator cores 12.

The coil terminal 84 is formed of a metallic material that can be electrically energized to electrically connect between the coils 16. A plurality of slots 92 into which coils are press-fitted are formed at the lower side of the coil terminal 84. A blade 94 is formed on both side ends of each of the slots 92, and thus plays a peel-off role of peeling off an insulating outer sheath surrounding the outer surface of the coil 16 when the coil 16 is press-fitted into the slot 92.

Further, a coil fixing groove 96 with which the coil 16 is fitted and fixed is formed on the inside of the slot 92.

A locking projection 36 is formed on the side of the coil terminal 84 and a locking recess 38 with which the locking projection 36 is locked is formed on the inner surface of the terminal pocket 82. Thus, when the coil terminal 84 is inserted into the terminal pocket 82, the locking projection 36 is in engagement with the locking recess 38, to thus prevent the coil terminal 84 from being seceded from the terminal pocket 82.

The action of the wiring unit that is configured as described above will follow. First, the ends of the coils 16 are seated on the respective seating grooves 86 of the terminal pocket 82. Then, the coil terminal 84 is inserted into the insertion grooves 90 of the terminal pocket 82, and thus the coils 16 are fitted into the slots 92. Here, since the slots 92 are narrow, the insulating outer sheaths of the coils 16 are peeled off by the blade 94 formed at the ends of the slots 92, and only the coils 16 whose insulating outer sheaths have been peeled off are press-fitted. Further, the coils 16 are respectively fixed in the coil fixing grooves 96 formed in the slots 92.

As described above, the single rotor type motor according to the embodiment of the present invention is configured so that the terminal pocket is arranged on the outer surface of the stator core in opposition to the inner surface of the stator core facing the rotor, to thus secure a sufficient space in which the terminal pocket can be placed and to thereby solve the coil disconnection problem.

Further, the single rotor type motor according to the embodiment of the present invention is configured so that the blade is formed on the coil terminal. Thus, when the coil terminal is inserted into the terminal pocket, the insulating outer sheaths of the coils are peeled off by the blade, and thus no further action of peeling off the insulating outer sheaths of the coils is required to improve the assembly of the motor.

Figure 7:
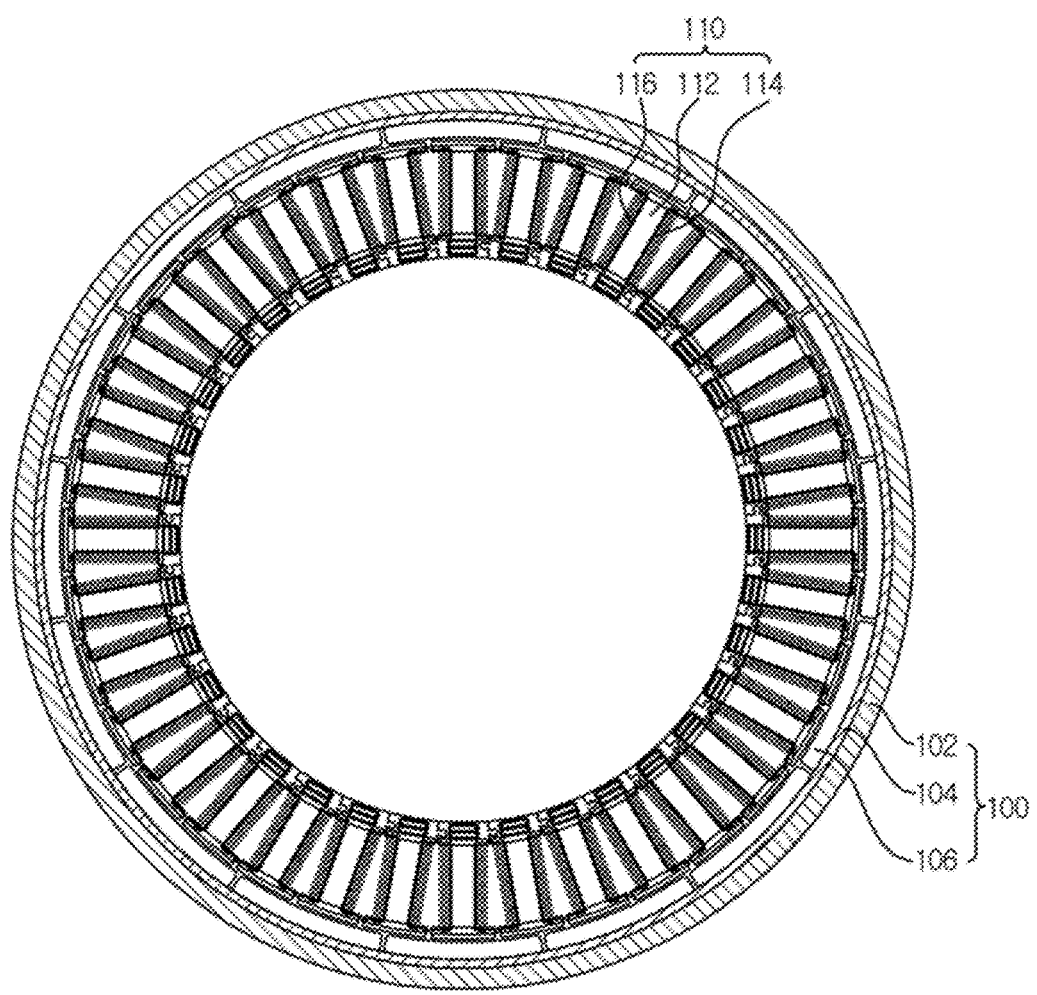
FIG. 7 is a plan view of a motor according to a second embodiment of the present invention.
Figure 8:
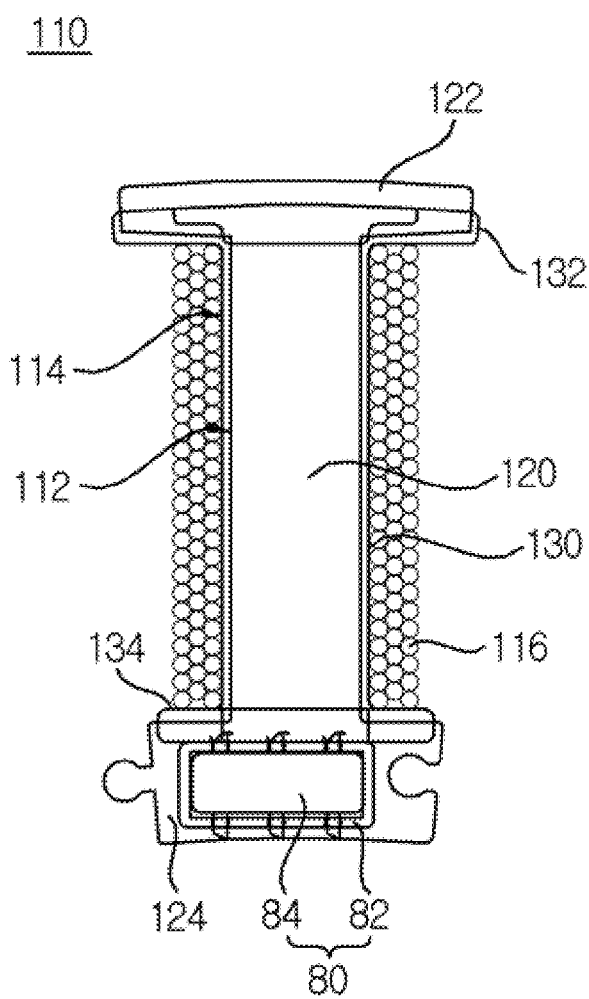
FIG. 8 is a partially enlarged view of a stator according to the second embodiment of the present invention.

FIG. 7 is a plan view of a motor according to a second embodiment of the present invention, and FIG. 8 is a partially enlarged view of a stator according to the second embodiment of the present invention.

Referring to FIGS. 7 and 8, a motor according to the second embodiment of the present invention is configured to include a stator 110; and a rotor 100 that is disposed with a certain gap from the outer surface of the stator 110, in which the rotor employs an outer rotor type in which the rotor 100 is arranged on the outer circumferential surface of the stator 110.

The rotor 100 includes: a magnet 106 disposed with a certain gap from the inner surface of the stator 110; a back yoke 104 disposed on the back surface of the magnet 106; and a rotor support 102 to which the magnet 106 and the back yoke 104 are fixed and at the center of which a rotating shaft is mounted.

The stator 110 includes: a plurality of stator cores 112 that are divided in a plural number and radially arranged, a bobbin 114 made of an insulating material and wrapped on an outer surface of each of the stator cores 112, and coils 116 wound on an outer surface of the bobbin 114.

The stator core 112 includes: a rod portion 120 of a plate shape having a certain width and around which coils are wound; an outer tooth portion 122 that is extensibly formed in a bilateral direction on the outer end of the rod portion 120 and that is disposed facing a magnet 106 of the rotor; and a connecting portion 124 that is formed at the inner end of the rod portion 120 and that connects between the stator cores that are disposed adjacently each other, so that the stator cores 112 are arranged in a radial shape.

Here, since the connecting portion 124 is substantially the same as the connecting portion 54 described in the previous embodiment of the present invention, the detailed description thereof will be omitted.

The bobbin 114 includes: a coil winding portion 130 that is formed to be wrapped around the outer circumferential surface of a plurality of rod portions 120 in a state where the rod portions 120 are stacked and around which coils 116 are wound; a first extension portion 132 that is formed on the outer end of the coil winding portion 130 and surrounds the outer tooth portion 122 so as to expose the inner surface of the outer tooth portion 122; and a second extension portion 134 that is formed on the inner end of the coil winding portion 130 and surrounds a part of the connecting portion 124.

In addition, a wiring unit 80 that connects between the coils wound around the split stator cores is provided in the second extension portion 134.

Here, since the wiring unit 80 is substantially the same as the wiring unit 80 described in the previous embodiment of the present invention, the detailed description thereof will be omitted.

The motor according to the second embodiment of the present invention is configured to have a rotor of an outer rotor type in which the rotor is arranged with a certain gap from the outer circumferential surface of the stator, in which case the wiring unit 80 is arranged on the inner surface of the stator core and the coil pocket 82 is integrally formed on the inner end of the bobbin.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention may be applied to a single rotor type motor in which a coil terminal for electrically connecting between stator coils is placed on a bobbin of a stator, to thus make it easy to assemble the motor and solve a coil disconnection problem.

What is claimed is:

1. A single rotor type motor comprising:
    a plurality of stators radially arranged, each of the stators including a stator core, a bobbin made of an insulating material and wrapped on an outer surface of the stator core, and coils wound on an outer surface of the bobbin; and
    a single rotor disposed with a certain gap from an inner surface or an outer surface of the stator; and
    a wiring unit for electrically wiring the coils wound on the bobbin, the wiring unit being arranged at an opposite side to the single rotor with respect to the stators,
    wherein the wiring unit includes: a terminal pocket integrally formed with the bobbin, the terminal pocket having a seating groove and an insertion groove, and a coil terminal made of a metal material, wherein the coil terminal is configured to be inserted into the insertion grooves of the terminal pocket, and end portions of the coils are inserted into the seating groove and exposed to the insertion groove, and
    wherein the coil terminal includes a slot of which one end is open and the other end is closed, a blade formed at the open end of the slot, and a coil fixing groove formed spaced apart from the blade, wherein the coil terminal is configured in such a way that the blade cuts an insulation outer sheath of the end portions of the coils inserted into the seating, and the cut end portions of the coils is press-fitted into the coil fixing groove when the coil terminal is inserted into the insertion groove, thereby electrically connecting the coils.

2. The single rotor type motor of claim 1, wherein the stator core comprises:
    a rod portion of a plate shape and around which the coils are wound;
    a tooth portion that is protruded in a lateral direction on one end of the rod portion and that is disposed facing a magnet of the rotor; and
    a connecting portion that is formed at the other end of the rod portion and that connects neighboring stator cores to each other,
    wherein the wiring unit is disposed on the connecting portion.

3. The single rotor type motor of claim 1, wherein the wiring unit forms a neutral point (NP) at which three-phase coils of U, V, and W phases are mutually wired.

4. The single rotor type motor of claim 1, wherein the terminal pocket and the bobbin form an integrally molded structure.

* * * * *